United States Patent
Vogt et al.

(10) Patent No.: US 10,584,054 B2
(45) Date of Patent: Mar. 10, 2020

(54) METHOD AND DEVICE FOR CONTINUOUS SEPARATION OF GLASS

(71) Applicant: Schott AG, Mainz (DE)

(72) Inventors: Jürgen Vogt, Oberheimbach (DE); Thomas Rossmeier, Bodenheim (DE); Dirk Förtsch, Waldalgesheim (DE)

(73) Assignee: Schott AG, Mainz (DE)

( * ) Notice: Subject to any disclaimer, the term of this patent is extended or adjusted under 35 U.S.C. 154(b) by 123 days.

(21) Appl. No.: 15/661,719

(22) Filed: Jul. 27, 2017

(65) Prior Publication Data
US 2017/0369357 A1 Dec. 28, 2017

Related U.S. Application Data

(63) Continuation-in-part of application No. PCT/EP2016/056612, filed on Mar. 24, 2016.

(30) Foreign Application Priority Data

Mar. 27, 2015 (DE) .................... 10 2015 104 801

(51) Int. Cl.
*C03B 33/09* (2006.01)
*B23K 26/356* (2014.01)
(Continued)

(52) U.S. Cl.
CPC ........ *C03B 33/093* (2013.01); *B23K 26/0006* (2013.01); *B23K 26/083* (2013.01);
(Continued)

(58) Field of Classification Search
CPC .... C03B 33/093; C03B 33/03; C03B 33/0235
See application file for complete search history.

(56) References Cited

U.S. PATENT DOCUMENTS

| | | | |
|---|---|---|---|
| 5,984,159 | A | 11/1999 | Ostendarp et al. |
| 2002/0006765 | A1 | 1/2002 | Michel et al. |

(Continued)

FOREIGN PATENT DOCUMENTS

| | | | |
|---|---|---|---|
| DE | 10 2004 014 276 | A1 | 10/2005 |
| DE | 10 2014 113 149 | A1 | 3/2016 |

(Continued)

OTHER PUBLICATIONS

JP2004-066745A Machine Translation Google Patents, 10 pages, Performed Jan. 25, 2019. (Year: 2019).*

(Continued)

*Primary Examiner* — Lisa L Herring
(74) *Attorney, Agent, or Firm* — Taylor IP, P.C.

(57) ABSTRACT

A method for separating a thin glass, in which method the thin glass is progressively heated along a path which forms a parting line, wherein the heating of the glass is realized by way of the energy of at least one energy source within an area of action of the energy source on the thin glass, and, by way of a temperature gradient of the glass heated by way of the at least one energy source in relation to the surrounding glass, a mechanical stress is generated in the glass, by way of which mechanical stress, a crack propagates, following the mechanical stress, along the parting line.

16 Claims, 7 Drawing Sheets

(51) Int. Cl.
- *C03B 33/023* (2006.01)
- *B23K 26/146* (2014.01)
- *B23K 26/00* (2014.01)
- *B23K 26/08* (2014.01)
- *B23K 26/18* (2006.01)
- *C03B 33/03* (2006.01)

(52) U.S. Cl.
CPC ............ *B23K 26/146* (2015.10); *B23K 26/18* (2013.01); *B23K 26/356* (2015.10); *C03B 33/0235* (2013.01); *C03B 33/03* (2013.01); *C03B 33/091* (2013.01)

(56) References Cited

U.S. PATENT DOCUMENTS

| | | |
|---|---|---|
| 2002/0032117 A1 | 3/2002 | Peuchert et al. |
| 2003/0145624 A1 | 8/2003 | Luettgens et al. |
| 2007/0170161 A1* | 7/2007 | Yoo ................... C03B 33/093 219/121.72 |
| 2008/0074747 A1 | 3/2008 | Cheng et al. |
| 2013/0126576 A1 | 5/2013 | Marshall et al. |
| 2013/0207058 A1 | 8/2013 | Wegener et al. |
| 2014/0054348 A1* | 2/2014 | Teranishi ............ C03B 33/0215 225/2 |
| 2014/0113797 A1 | 4/2014 | Yamada et al. |
| 2014/0138420 A1* | 5/2014 | Peng .................. C03B 33/076 225/2 |
| 2014/0148073 A1* | 5/2014 | Liu .................... C03B 33/033 445/24 |
| 2016/0002088 A1 | 1/2016 | Mizumura et al. |
| 2018/0093913 A1* | 4/2018 | Burdette .............. B23K 26/38 |

FOREIGN PATENT DOCUMENTS

| | | |
|---|---|---|
| JP | 2004-66745 A | 3/2004 |
| JP | 2009-102178 A | 5/2009 |
| WO | 00/05026 A1 | 2/2000 |
| WO | 2011/026074 A1 | 3/2011 |
| WO | 2015/044430 A1 | 4/2015 |

OTHER PUBLICATIONS

JP2004-066745 English Translation Performed by Schreiber Translations, Inc. Feb. 2019. (Year: 2019).*

Notice of Transmission of the International Research Report and the Written Notice Issued the International Searching Authority or Declaration dated Jun. 16, 2016 for International Patent Application No. PCT/EP2016/056612 (19 pages).

* cited by examiner

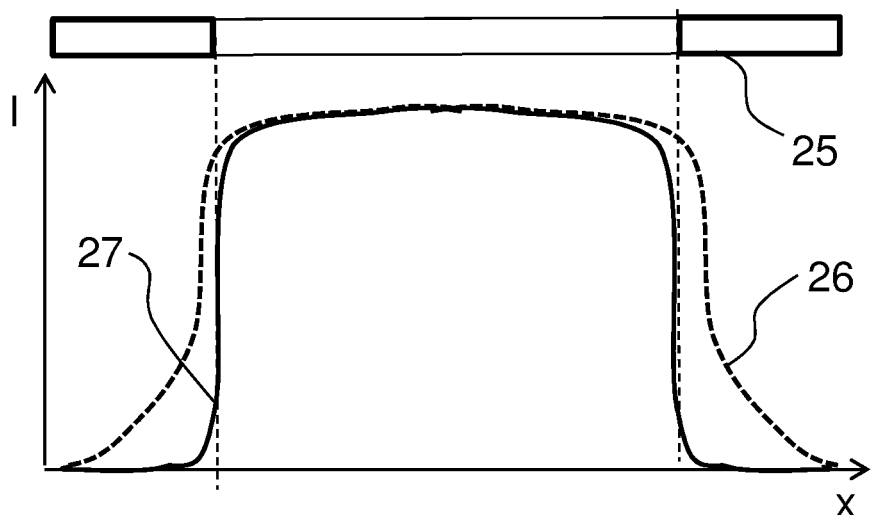
Fig. 5
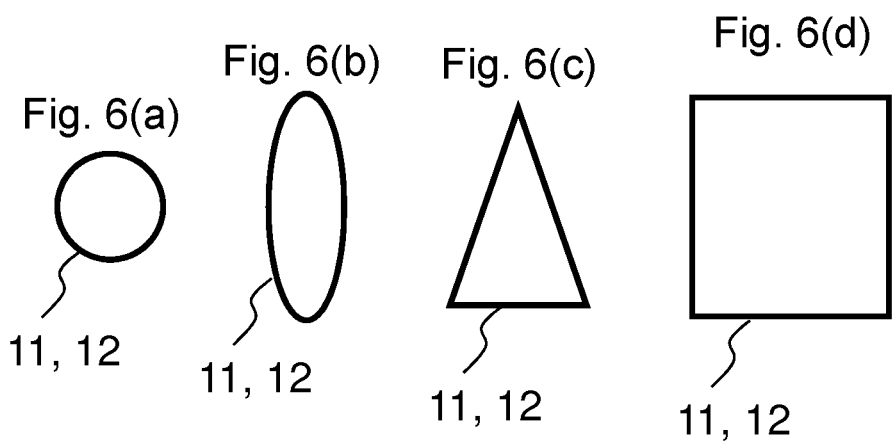
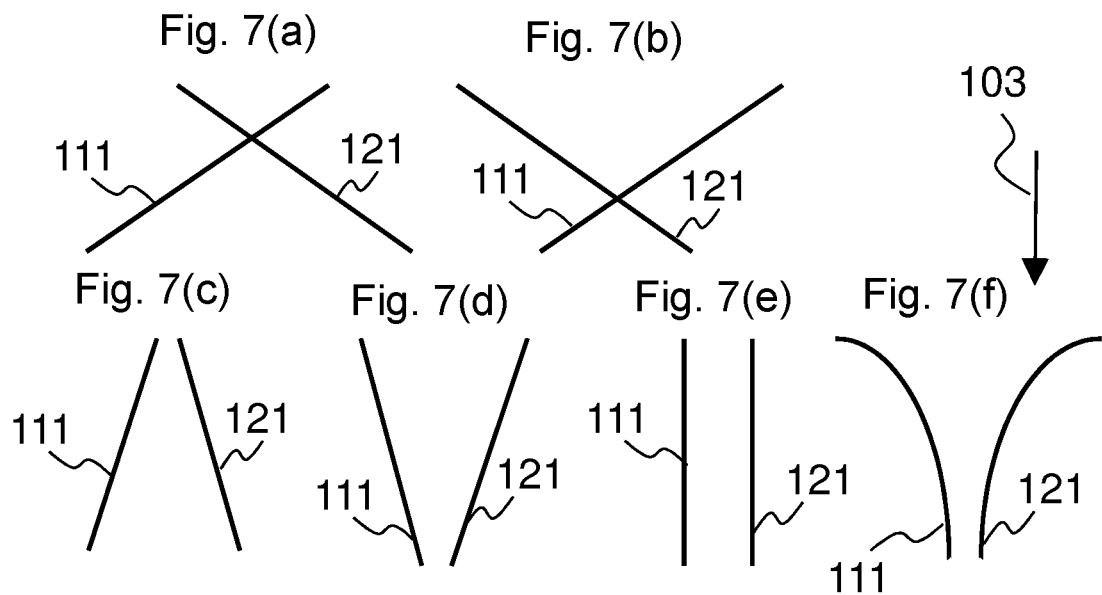

METHOD AND DEVICE FOR CONTINUOUS SEPARATION OF GLASS

CROSS REFERENCE TO RELATED APPLICATIONS

This is a continuation of PCT application No. PCT/EP2016/056612, entitled "METHOD AND DEVICE FOR THE CONTINUOUS SEPARATION OF GLASS", filed Mar. 24, 2016, which is incorporated herein by reference.

BACKGROUND OF THE INVENTION

1. Field of the Invention

The present invention relates to the separation of glass, and, more particularly to the separation of glass by stress crack separation.

2. Description of the Related Art

A known method of glass separation is scoring and breaking. In this process, a linear failure zone is typically introduced into the glass by a scoring wheel. By applying mechanical stress, the glass can then be easily separated along this failure zone. However, one disadvantage herein is that the edge of a thus obtained glass element may be damaged due to the previously created failure zone. Since the edges are especially critical with regard to mechanical stress of the glass under tensile stress, separation of a glass by scoring and breaking can lead to a clear reduction of strength, in particular in the case of a flexural load.

Flat glasses, especially thin and very thin glasses having thicknesses of less than 1.2 mm, for example less than 200 microns are currently produced often in the form of long ribbons. Based on the manufacturing process, for example when re-drawing a glass ribbon from a pre-form, or when drawing from a melt, thickened edge regions—so-called braids—typically form along the edge of the glass ribbon. It is advantageous to remove these braids after production of the glass ribbon; in the case of thin glasses—among other things—to facilitate winding onto a roll or in general to facilitate further processing. As a result, problems can be avoided such as, for example the creation of greater mechanical stresses caused by the thicker braids, or an increase of twisting or warping of the thin glass.

A device and a method for continuous edge separation from a thin glass ribbon are known from US 2013/0126576 A1. With this device, initial flaws are imposed into the glass ribbon by a scoring device. While the glass ribbon is guided in its longitudinal direction over a curved levitation support, it is heated by a laser beam and cooled by a fluid so that thermal stresses are induced inside the glass ribbon. This causes the glass ribbon to tear in the longitudinal direction, originating from an initial flaw.

WO 2011/026074 A1 describes a method to impose a slit into a glass substrate. In this method, a laser beam is directed onto a flaw and advanced over the glass surface. Moreover, a fluid stream is directed directly onto the laser spot on the glass surface, so that the glass is cooled down, even before the temperature that is produced by the laser beam is completely equalized through the thickness of the glass substrate. The thermal stress is generally limited to a portion of the thickness of the glass substrate, and the resulting slit propagates only partially through the thickness of the glass substrate.

Glass edges produced by laser induced stress scoring and breaking typically have no, or only very few defects, especially at the corners of the edge profile. The strength of a glass and its life span when subjected to flexural maybe significantly influenced by the strength of the edges. In this respect, edges produced with laser induced stress crack separation should in principle have high strength and the thus produced glass panes should possess an accordingly high lifespan when under bending stress. However, breakage tests on thin glasses show that this is generally not the case and that edges produced with stress crack separation can have lower strength than edges that are produced with conventional scoring and breaking. Here, it depends not only on the average breaking strength, but in fact the breadth of the distribution of probability of breaking is also decisive. If a glass edge that was produced in a certain manner has great breaking strength in principle, which however fluctuates greatly from one sample to another, a higher probability of failure can result, compared with a less stable edge which however has only a lower variation in the breaking stress.

$CO_2$ lasers may be used for the stress crack separating process. This method was originally developed for cutting of glasses having a thickness of between 0.5 mm and 4 mm. Here, the superficially introduced energy of the laser beam is intended to build up a temperature gradient between top and bottom side of the glass. The necessary temperature and stress gradient that advances the stress crack is built up by a cooling nozzle During the test to apply the method to thinner glasses, in particular glasses having thicknesses of less than 250 µm, the problem arose that these glasses are warmed up so rapidly (typically within milliseconds) that a sufficiently high temperature gradient cannot be maintained until impingement of the cooling jet.

An additional problem is that the heat energy that is necessary for the stress crack to produce the stress gradient can only be introduced into the glass over the surface of the radiation geometry via the output of a heat source. Hitherto this may occurr by a certain beam geometry as well as through an adjustable and variable output-density. Due to the two-dimensional expansion of the laser spot on the surface of the glass on which almost the entire output of the laser is absorbed, no sharp temperature gradients occur. Depending on local output density and thermal conductivity, these are more or less diffused. This may result in that the advancement of the stress crack does not occur exactly along the intended path. Conversely, the same applies also to the targeted cooling of the glass surface.

What is needed in the art is a laser induced stress crack device and method for improving the strength and the defined progression of glass edges.

SUMMARY OF THE INVENTION

The present invention provides a device and method to distribute the thermal energy optimally, and conversely, to remove it again through cooling to produce an especially steep temperature gradient.

A stress gradient is generated according to the invention, two-dimensionally over the entire volume of the glass which is consequently effective turned by 90°, thus enabling also a controlled separation along a desired parting line. To apply the stress gradient into the plane of the glass, at least one energy source with one effective field or one effective zone is provided. The glass that is to be cut thus absorbs the energy and is very rapidly heated due to its low thickness. Heat transfer begins simultaneously in the volume of the glass resulting in that—based on the special shape of the effective zone according to the invention—a pressure stress builds up on both sides, next to the predefined cut that provides control to the actual cut.

According to the invention a method is provided for separating thin glass having a thickness of less than 1.2 mm, fore example having a thickness in the region of 5 µm to 150 µm, wherein the thin glass is progressively heated along a path which forms a parting line, wherein heating of the glass is realized by way of energy of at least one energy source within an effective zone of the energy source on the thin glass. The effective zone is hereby moved over the thin glass along the parting line. The effective zone is herein moved over the thin glass along the parting line so that by way of the temperature gradient of the glass that is heated by way of at least one energy source, a mechanical stress is generated in the glass in relation to the surrounding glass due to which a crack propagates, following the mechanical stress along the parting line. Two partial regions of the effective zone are spaced laterally relative to the parting line and frame a cut-out in the effective zone through which the parting line progresses, in such a way that in the section of this space, regions of the thin glass next to the parting line are heated more strongly than regions on the parting line. The effective zone is shaped so that during movement of the thin glass along the parting line these partial regions merge in the direction of movement of the thin glass and meet on the parting line. The cut-out is open toward the front, so that the glass passes the edge of the effective zone only one time on the parting line during the movement relative to the effective zone.

The effective zone therefore has a shape wherein its front end that crosses over the glass first during the cutting process has two forward protruding regions that merge at the provided parting line. In this way, the effective zone has a convex incision or rather a cut-out at the front end, through which the parting line runs.

The invention also provides a method for separation of thin glass having a thickness of less than 1.2 mm, wherein the thin glass is progressively heated along a path which defines a parting line. The heating of the glass occurs by way of two energy sources which respectively impinge in an impingement region on the glass, thus heating same. The two impingement regions herein form the effective field or effective zone. The energy sources are directed onto the glass in such a way that the impingement regions are offset laterally to one another, in the vertical direction relative to the parting line. These impingement regions that are laterally offset to one another, diagonally relative to the parting line accordingly lead to high stress in the lateral direction diagonally to the parting line. This also permits reliable separation of very thin glasses with a smooth edge that follows the intended parting line very precisely. This lateral stress may be increased in that the two impingement regions are indeed offset diagonally relative to the parting line according to the invention, but overlap centrally in an overlap region. The parting line, or respectively the intended path accordingly progresses through this overlap region. Because of the temperature difference between the glass that is heated by way of the energy sources and the surrounding glass, especially the glass entering the overlap region along the parting line, due to the continuous heating or respectively the advancement of the thin glass relative to the energy sources, a mechanical stress is produced in the glass as a result of which a crack following the mechanical stress propagates along the parting line. The non-overlapping areas of the impingement regions furthermore ensure that the crack is maintained stable and does not spread out.

The two energy sources can impinge onto the glass in a synchronized manner.

These impingement regions may also be arranged side by side, diagonally to the cutting device. The regions may also have the same shape and intensity.

After heating with the energy sources, the thin glass may then cooled with a cooling jet, whereby the cooling jet is moreover directed onto the glass in such a manner that it impinges onto the parting line. Generally, crack propagation occurs already through heating in the overlap region and the herewith associated temperature difference in relation to the surrounding glass. The cooling jet may serve to spatially separate the edges that are already produced through crack propagation. This avoids that the edges strike again against each other, causing defects that can adversely affect the edge strength.

The method can generally be applied on thin glasses having a thickness of 1.2 mm or less. Special advantages however, present themselves with very thin glasses having thicknesses in the range of 5 µm to 150 µm, for example to 100 µm, for example 20 µm to 100 µm. Especially with these very thin glasses the problem of very rapid heating arises, which may prevent the build-up of a sufficient vertical temperature- and thereby stress gradient. The invention now solves this problem through the very high temperature gradient at the beginning of the overlap region.

The cooling jet can be a gas jet, for example an air jet, or also an aerosol jet. The aerosols may be air-water and air/alcohol mixtures.

The cooling jet can also be a liquid jet or droplet jet. The droplet jet can be easily produced by an inkjet printer head.

It may be advantageous if the flow of the cooling jet, in other words the volume flow of the cooling fluid, is selected depending on the thickness of the glass. A higher cooling jet flow in the case of a thinner glass may be selected. If therefore, during the process a change is made from a thicker glass to a thinner glass, then the cooling jet is increased, or vice versa. The flow can also be adjusted proportionally to the glass thickness. With a glass thickness for example of 50 µm, a flow that is approximately twice as high as the flow that is especially suitable for a 100 µm glass may be advantageous. Generally, very low flows are already sufficient, whereby for a glass thickness of 100 µm the optimum cooling jet flow is almost at zero. A certain cooling jet flow however may always be desired. Completely without the cooling jet the cutting process can become unstable, or have a poor start and this could result in interruptions in the process, whereby the crack does not propagate further. A flow that is too strong on the other hand, can lead to thermally or mechanically induced wave formation in the glass.

With thin glasses that have a thickness of less than 100 µm, separation of the glass may also be readily achieved without a cooling jet. The cooling jet has however proven to be generally advantageous for contracting the glass after separation by way of the propagating crack in order to thereby avoid that the just produced glass edges abut one another again. This effect could potentially have a strength reducing effect upon the glass edges.

With a suitable selection of the shape of the impingement regions, pre-heating of the cutting zone by way of both energy sources—for example laser beam—may occur until they meet. The stress gradient at the point of convergence of both energy sources at their energy maximum that is necessary for stress crack separation can be adjusted by way of beam geometry, laser output, positioning of both laser beams relative to one another, feed velocity and possibly more.

The present invention also provides a device for separating thin glass having a thickness of less than 1.2 mm, for example a thickness in the range of 5 µm to 150 µm. The device includes at least one energy source and one device, to let the energy provided by the energy source become effective on the thin glass in an effective zone, so that the thin glass in the region of the effective zone heats up. A feed device is provided to advance the thin glass and the effective zone relative to one another along a provided parting line, so that by way of the temperature difference of the glass that is heated by way of the energy sources, a mechanical stress is generated in the glass in relation to the surrounding glass due to which a crack propagates, following the mechanical stress along the parting line. A device is provided that produces the effective zone with a shape that comprises two partial regions that are spaced laterally relative to the parting line and frame a cut-out in the effective zone through which the parting line progresses, in such a way that in the section of this space, regions of the thin glass next to the parting line are heated more strongly than regions on the parting line; so that during movement of the thin glass along the parting line these partial regions converge in the direction of movement of the thin glass and meet on the parting line.

According to another embodiment of the device, the effective zone is formed by the impingement regions of two energy sources. An appropriate device for separating thin glass accordingly includes a device for the provision of at least two energy sources or respectively energetic media, as well as a device to direct the energy sources onto the thin glass in such a manner that they impinge onto the thin glass always in an impingement region so that the impingement regions are offset laterally to one another in vertical direction relative to the parting line and overlap in an overlap region. Moreover, a feed device is provided to advance the thin glass and the impingement region relative to one another along a provided parting line, so that due to the temperature difference of the glass that is heated by way of the energy sources, in relation to the surrounding glass, for example in relation to the glass feeding into the overlap region along the parting line, a mechanical stress is generated in the glass due to which a crack propagates, following the mechanical stress along the parting line.

Another preferred embodiment of the invention provides for a device for masking of one section of the effective field or effective zone. By way of the device for masking a section of the effective zone, the cut-out in the effective zone is formed.

In accordance with another embodiment of the invention a cooling jet generator is provided to produce a cooling jet, wherein the parting line runs through the impingement region in such a way that—during movement of the feed device—a point of the thin glass that is positioned on the parting line first passes through the overlap region of the two impingement regions and then through the impingement region of the cooling jet.

Ultimately, the relative movement of glass and energy sources relative to one another matter. Accordingly, it is possible to keep the energy sources stationary and to move the thin glass or vice versa to move the impingement regions of the energy sources and the cooling jet over a stationary thin glass.

To be able to control the crack propagation as closely as possible and to avoid lateral breakout of the crack it is generally advantageous, if the stress progression with regard to the path is symmetrical. To achieve this, regions of impingement are produced with the energy sources that are congruent with one another on the glass. Also, the impingement regions can be symmetrically identical with a mirror axis that progresses along the path. An especially high symmetry is achieved if the parting line or respectively the path represent the mirror axis and if also the impingement region of the cooling jet is located on the path.

The crack that is produce by the method can be an incipient crack that will not yet separate the thin glass. Separation can occur by applying a bending moment to the parting line. According to this embodiment the invention relates then to scoring and breaking. According to one preferred embodiment, the crack can however separate the thin glass through its entire thickness, so that after propagation of the crack the glass is separated at the crack.

An especially suitable geometry for the production of the high mechanical stress in the glass is achieved through impingement regions whose inside edges that face each other progress diagonally to the parting line, in such a way that, for a given point on the parting line during progressive heating along the parting line, these inside edges progress toward the point. If this point is crossed by the inside edges, the overlap region starts which then moves over the point. In this overlap region, the energy input is especially high, so that a steep temperature- and thus also stress gradient is achieved.

Suitable energy sources are laser beams. The two laser beams as the energy source can originate from a single laser and can for example be produced through beam splitting of a single laser beam. In this case the device for the provision of two energy sources comprise the laser itself and the device for beam splitting.

An especially suitable laser is an infrared laser whose light is absorbed already in regions very close to the glass surface. This applies for glass, for example wavelengths above 3 µm. A $CO_2$ laser is also suitable. This type of laser emits infrared radiation at wavelengths greater than 5 µm, which leads to very high absorption on the surface of the glass, and low reflection. This makes a $CO_2$ laser highly efficient for heating of the glass.

Other energy sources or respectively energetic media besides a laser are also conceivable, for example flames or infrared radiators.

The invention is also especially suitable to separate braids from a thin glass in the embodiment of a thin glass ribbon. The braids may, for example be manufacturing-related edge regions with greater glass thickness than that of the average quality range. The invention is therefore also suitable for trimming.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 illustrates the beam profiles of an energy source, before and after a beam formation with an aperture;

FIGS. 6(*a*)-6(*d*) illustrate embodiments of beam geometries of individual beams;

FIGS. 7(*a*)-7(*f*) illustrate examples of symmetrically identical configurations of individual beams relative to the center lines of impingement regions;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
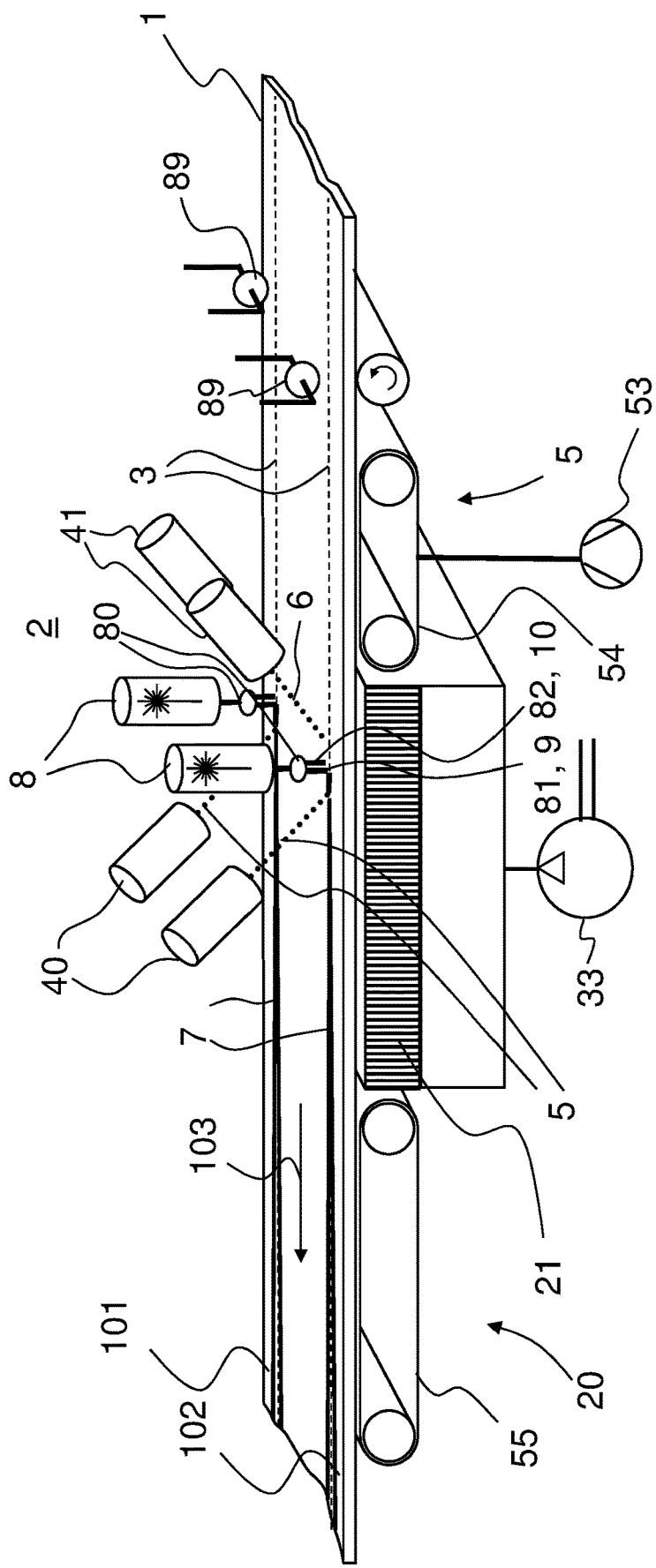
FIG. 1 illustrates a device to implement the method.

FIG. 1 illustrates an embodiment of an inventive device 2 for stress crack separation of thin glasses 1. In the illustrated embodiment, device 2 is designed according to a preferred application of the invention for separating braids 101, 102 from thin glass 1 in the embodiment of a thin glass ribbon.

The method of separating glass that can be implemented with the inventive device, in this case specifically separating of braids 101, 102 from a thin glass ribbon is based in that a thin glass a ribbon 1 with a maximum thickness of 1.2 mm, for example a maximum of 400 µm, for example in the range of 5 µm to 150 µm is guided along a longitudinal feed direction 103 by way of a transport device 20 over a levitation support 21. According to another embodiment of the invention, lasers 8 are provided which direct laser beams onto the thin glass ribbon in the region of levitation support 21 and which heat thin glass 1 locally while the thin glass ribbon passes in longitudinal feed direction 103, so that the energy sources are drawn along parting lines 3 in feed direction 103 of the thin glass ribbon 1. Longitudinal feed direction 103 is expediently oriented in longitudinal direction of the thin glass ribbon 1. A cooling jet 5 may be blown onto the heated path by means of a cooling jet generator 40, so that the heated region is cooled off again, and that through cooling a mechanical separation is caused at the edges that are already cut at the point of the highest temperature difference between cold glass and merge point of both laser beams, in order to avoid contact between the two edges during subsequent progression of the movement, since this would lead to damage of the edges and therefore to a reduction in the edge strength. As shown in FIG. 1, a second cooling jet generator 41 whose cooling jet 6 impinges on the glass before the impingement regions of the energy sources can be provided as an option. A second cooling jet 6 is therefore used whose point of impingement 52 in feed direction is located before impingement regions 11, 12 of energy sources 9, 10, so that a point of thin glass 1 on the parting line during forward feed first passes through point of impingement 52 of the second cooling jet 6, then through the overlap region and then through the point of impingement of first cooling jet 5.

A gas jet, for example an air jet can be used as the cooling jet. Also, aerosol jets can be used as cooling jets. A higher cooling performance is achieved through the liquid phase of the aerosol, and thereby also a higher negative heat expansion. Moist air has also proven to be advantageous in stabilizing the cutting process. This is the case even if no liquid phase is present initially in the air, in other words the air is not present in aerosol form, at least not prior to the gas emission. A relative humidity of the gas that is used for the cooling jet (for example air as the gas) of 70% to 100%, for example greater than 80%, for example greater than 90%. Cooling and condensation and thereby formation of an aerosol can conceivably be achieved through adiabatic relaxation. According to yet another embodiment, a droplet jet with successively abutting droplets or a liquid jet, for example a water jet can also be used for cooling. A droplet jet can be easily produced by an inkjet printer head. Both, a droplet jet and a liquid jet offer the advantage that a greater cooling performance can be achieved on a very limited area. Additionally, for example, a cooling jet may be provided that is a moistened gas jet with a relative humidity of 70% to 100%, or comprises a liquid phase, either in the form of aerosol droplets, in the form of a liquid jet or as a droplet jet with successively abutting droplets. Cooling jet generator 40 comprises a device for production of a moistened gas jet with a relative humidity of 70% to 100%, in particular moistened with water vapor or the production of a cooling jet with a liquid phase. The relative humidity of the gas jet can be greater than 80%, for example greater than 90%.

According to another embodiment, a cooling jet with a flow of 0.05 liter/hour is used for separating a thin glass having a glass thickness of 100 µm. With a 50 µm thick glass, a cooling air flow of 0.4 liter/hour may be used.

The cooling jet flow, that is the cooling fluid volume flow can be between 0.001 l/h (liter per hour) and 1.0 l/h.

Without being limited to the embodiments, for glass thicknesses between 75 µm and 400 µm, for example a glass thickness of 100 µm (especially 100 µm plus/minus 10 µm) a volume flow of between 0.001 l/h and 0.3 l/h, for example 0.05 l/h (especially plus/minus 0.01 l/h) can be advantageous. For glass thicknesses between 5 µm and 75 µm, for example a glass thickness of 50 µm (especially 100 µm plus/minus 10 µm) a volume flow of between 0.06 l/h and 1.0 l/h, for example 0.4 l/h (especially plus/minus 0.1 l/h) can be advantageous.

The embodiment with separation of thin glass 1 on a levitation support 21 is of course not limited to the illustrated specific example. In general, and without being limited to the illustrated example, it is provided in accordance with one embodiment that thin glass 1 is supported on a gas cushion that is generated by a levitation support, or is guided over the gas cushion, wherein the impingement regions of the energy sources and the impingement region of cooling jet 5 are arranged in the section of thin glass 1 that is supported by the gas cushion.

In the embodiment illustrated in FIG. 1, the laser beam of laser 8 is split into two partial beams 81, 82 as energy sources 9, 10 which are then directed onto the thin glass 1 for heating. The impingement regions of laser beams 81, 82 are offset vertically relative to parting line 3. In contrast, the cooling jet is directed onto parting line 3 and, viewed in longitudinal feed direction 103 of the thin glass ribbon impinges therefore centered between the impingement regions of laser beams 81, 82.

In another embodiment, a scribing device 89 may be provided. To support the creation of a crack at the beginning of the separation process, a flaw or respectively an initial damage can be imposed by the scribing device 89 at the beginning of the thin glass ribbon before impingement of the laser beams. The damage may progress through the region that is heated by laser beams 81, 82 in order to initiate the stress crack.

After initiation of the stress crack, during crack propagation scribing device 89 may then be removed from the surface of thin glass ribbon 1, thereby halting the damage. Apparatus 2 therefore, may include a device to remove scribing device 89 after initiating of the stress crack during the crack propagation from the surface of thin glass ribbon 1. In contrast to what is provided in US 2013/0126576 A1, scribing occurs only at the beginning. However, it has been shown that crack propagation after initiation can occur simply on the basis of the temperature gradient due to optional cooling of the glass ribbon with a cooling fluid and subsequent heating with laser beam.

The scribing device 89 may be in the form of a scribing wheel, for example a small wheel having a structured scribing surface. FIG. 1 illustrates the thin glass ribbon after having imposed the initial damage in form of an incipient crack. The small scribing wheels are herein accordingly raised and are no longer in contact with the glass surface.

By way of a pressure source, for example a pump 33, compressed fluid, for example air, is fed to levitation support 21. The compressed fluid escapes through openings on its surface side that faces thin glass ribbon 1 so that a gas cushion forms between thin glass 1 and the surface of levitation support 21 that carries and supports thin glass 1. Instead of a pump 33 a reservoir with compressed fluid is also conceivable. To provide a uniform pressure, a reservoir and/or a throttle may also be interconnected with pump 33 and levitation support 21. In the area surrounding the cutting process, thin glass 1 is therefore moved suspended by way of gas levitation so that, on the one hand the ambient air acts as a thermal insulator and on the other hand, the entire Rayleigh length of the laser focus can be used as cutting region.

In accordance with one embodiment, transport device 20 comprises one or more transport belts 54, 55, as illustrated in FIG. 1. In the example illustrated in FIG. 1, two belts are provided, whereby viewed in direction of conveyance, belt 54 is arranged before levitation support 21, and belt 55 is arranged after levitation support 21. One belt that is arranged in direction of conveyance before levitation support 21 (in the example in FIG. 1 this is belt 54) may feature vacuum suction 53 to firmly hold the thin glass 1 on the belt. This permits exertion of sufficiently high pulling force without upstream process steps—for example a draw process from a smelt or a pre-form, or unwinding of the glass ribbon from a roll—having a negative influence on the cutting process.

The laser beams of laser 8 in the illustrated example may be divided by a beam splitter 80, for example into two symmetrically identical partial beams 81, 82. These partial beams 81, 82 are now directed onto thin glass 1 in such a manner that their impingement regions are offset left and right relative to parting line 3. In other words, the impingement regions are offset in vertical direction laterally relative to parting line 3. Laser beams 81, 82 thus represent energy sources 9, 10 according to an embodiment of the invention. In place of a beam splitter 80, a scanner may also be used with which two impingement regions can be illuminated with a single laser beam. It is of course also possible to use two separate lasers, whereby always one respectively illuminates one impingement region 11, 12.

For each parallel step, device 2 for separating thin glass therefore includes always one device for the provision of at least two energy sources and one device to direct energy sources 9, 10 onto thin glass 1 in such a way that they always impinge onto thin glass 1 in an impingement region, wherein impingement regions 11, 12 are offset laterally to one another in vertical direction relative to parting line 3. The device for the provision of the energy source is realized through a laser and the associated beam splitter 80. As explained below, with reference to FIG. 3, impingement regions 11, 12 overlap in an overlap region 13. A feed device 20 is provided to advance thin glass 1 and impingement regions 11, 12 relative to one another along an intended parting line 3. During movement of feed device 20, a point of thin glass 1 that is located on parting line 3 first passes through a first optional cooling jet, then through the overlap region of the two impingement regions and then through the impingement region of the second cooling jet, so that through the temperature difference that is produced by energy sources 9, 10 and the first optional cooling jet, a mechanical stress is produced in the glass that leads to propagation of crack 7 of the mechanical stress progressing along parting line 3.

Figure 2A:
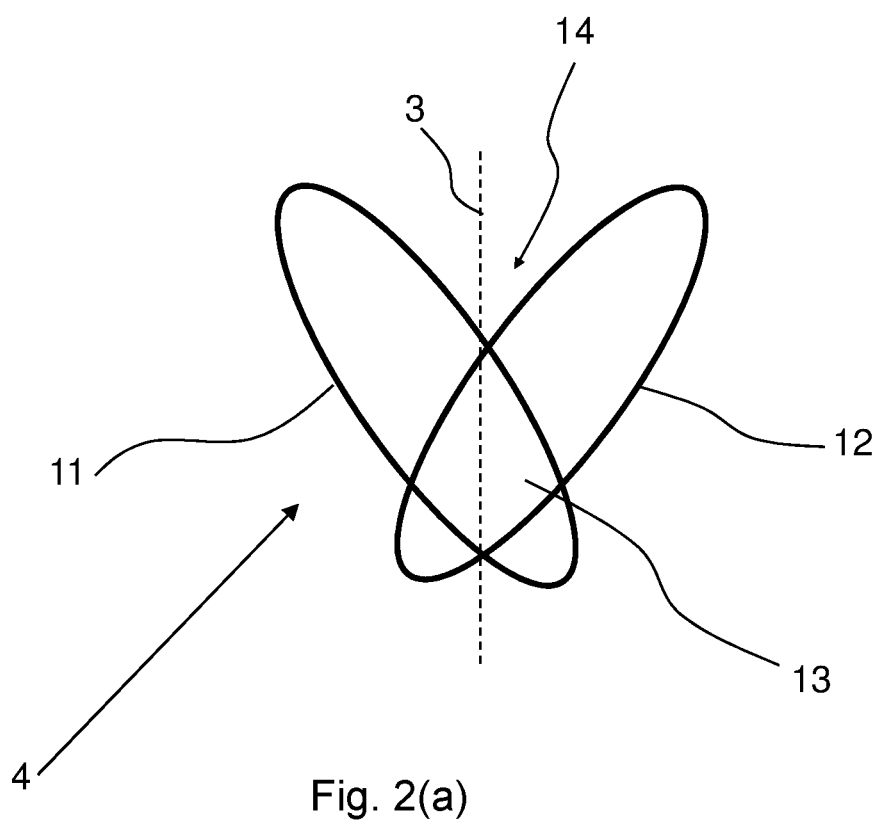
FIGS. 2(a)-2(b) illustrate examples of shapes of effective zones.

FIG. 2(*a*) generally illustrates two impingement regions 11, 12 that together form an effective zone. Based on the diagonal positioning relative to one another of the two impingement regions 11, 12 a cut-out 14 is located between these two regions.

A part of effective zone 4 can be masked by a masking device (not illustrated), thus creating cut-out 14. FIG. 2(*b*) illustrates an example of an effective zone 4 with a v-shaped cut-out 14 pointing in transport direction which divides two partial regions 42, 44 of effective zone 4, so that these are positioned at a distance transversely relative to parting line 3, wherein the edges of the partial regions facing one another progress toward one another and meet at the intersecting point of parting line 3 with effective zone 4. Such an effective zone 4 can also be produced with a single energy source, whereby for example as already stated, a masking is performed. The energy source may for example, be a laser beam wherein part of the laser spot that creates the impingement region is masked to create cut-out 14.

Figure 3:
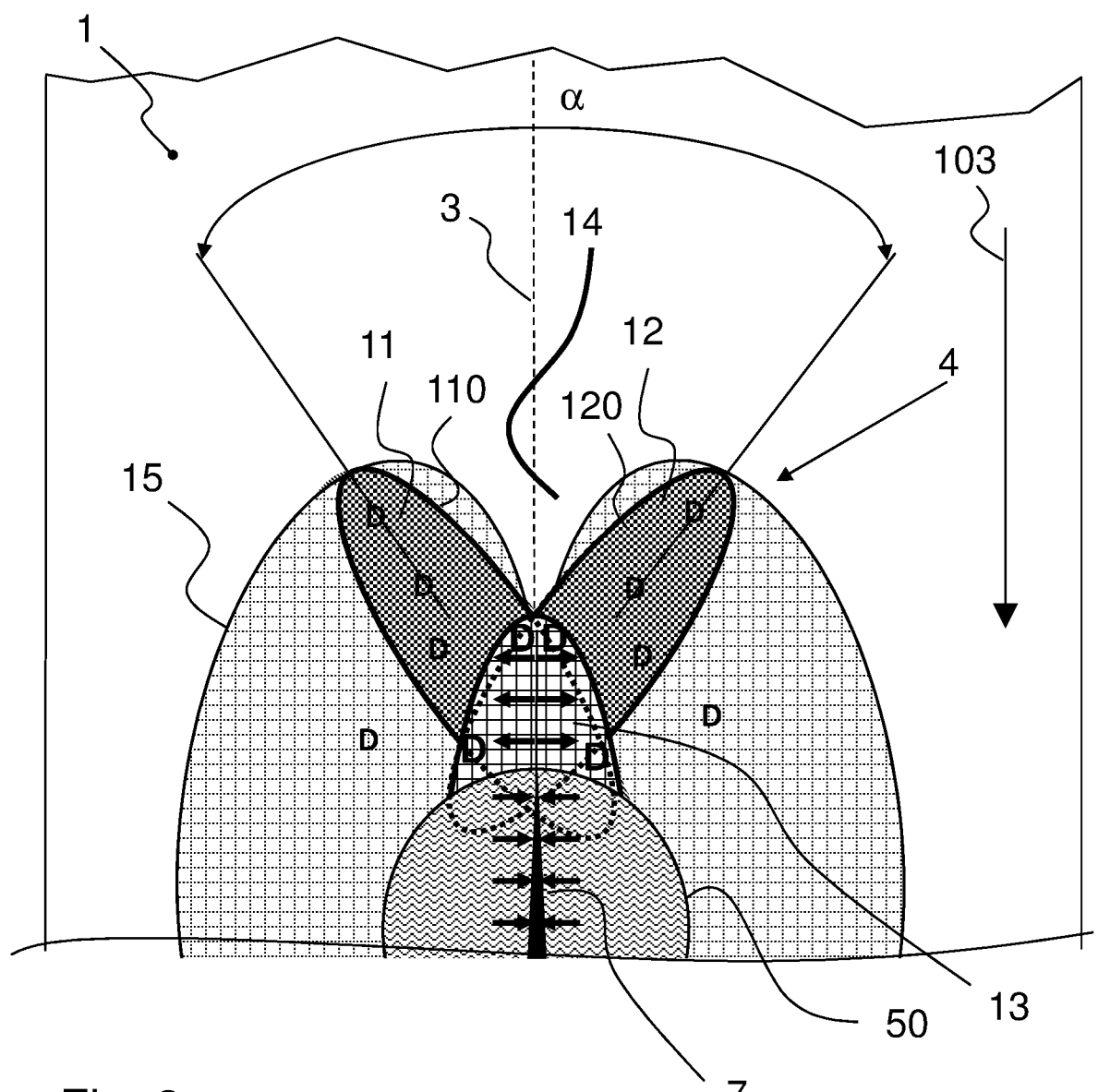
FIG. 3 illustrates the surface of a thin glass with impingement regions of the energy sources and the occurring temperature fields and mechanical stresses.

FIG. 3 illustrates one embodiment of the impingement region of energy sources 9, 10, as well as schematically the temperature and stress distribution on thin glass 1. Thin glass 1 travels along the feed direction, through impingement regions 11, 12 of the energy sources. In the illustration from top to bottom. Since impingement regions 11, 12 are positioned diagonally to parting line 3, a cut-out 14 is located between them. Together, impingement regions 11, 12 form an effective field or an effective zone 4. Impingement regions 11, 12 overlap in an overlap region 13. Accordingly, the greatest energy density is also achieved in this region. When the glass passes through this overlap region 13, a very steep temperature increase occurs vis-à-vis the cold glass that enters the overlap region along the parting line. Accordingly, this results in a high stress gradient and propagation of the crack. The two non-overlapping regions of impingement regions 9, 10 now ensure stable guidance of the crack. On a deviation of the progression from the parting line, the temperature and thus the stress gradient decrease in this region, due to the also present heating of the glass.

The geometry of the impingement regions, the output of the energy sources, their positioning relative to one another and the speed may be designed precisely so that the highest stress gradient is encountered at the predetermined location in overlap region 13. Thermal conduction zones 15 form around impingement regions 11, 12. Due to the heating, compressive stresses are present in the impingement regions, the thermal conduction zones 15 and particularly also in overlap region 13—as symbolized in FIG. 3 by the letter "D".

Figure 2B:
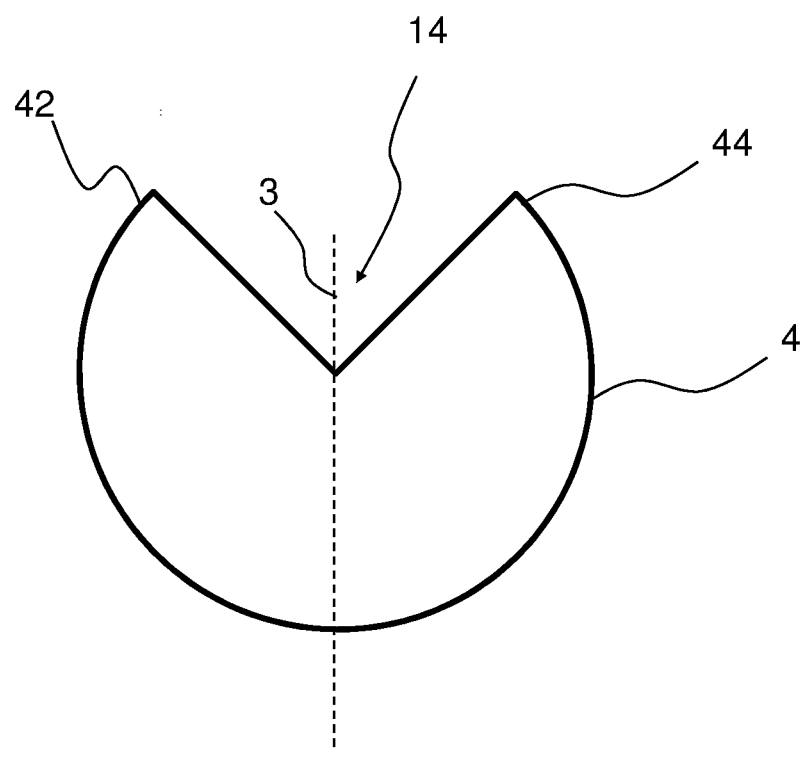

Behind the two impingement regions 11, 12 of energy sources 9, 10 the cooling jet impinges in impingement region 50 onto the glass surface and causes rapid cooling of the glass, so that the glass contracts and separates the already cut glass edges. Generally, and without limitation to the illustrated embodiment the individual energy sources 11, 12 separately, and also in conjunction with the cooling jet may not produce a stress gradient that is sufficient for propagation of the crack. Rather, this stress gradient is produced only in overlapping region 13. In principle however, with sufficient energy supply a stress crack separation is certainly possible, even with a single impingement region without an overlap zone—as illustrated in FIG. 2(b). This can be accomplished even without cooling jet. In principle, the cooling jet may however be advantageous for better stability of the separation process.

The cooling jet may be an aerosol jet. A liquid jet or a droplet jet may also be used for cooling. Also, conceivable is a gas jet that is moistened with water vapor, for example a moistened air jet. The relative humidity is herein preferably at least 70%.

Impingement regions 11, 12 of the embodiments illustrated in FIG. 3 have an elongated, especially oval or elliptical shape. Impingement regions 11, 12 are arranged with their longitudinal axis diagonally relative to parting line 3. To produce a stress distribution that is as symmetrical as possible relative to parting line 3 it is advantageous if—as is also demonstrated in the illustrated example—impingement regions 11, 12 are congruent and are moreover symmetrically identical, wherein parting line 3 also represents the mirror axis. This further results in that the glass is heated by energy sources 9, 10, that impingement regions 11, 12 are produced whose inside edges 110, 120 which face each other progress diagonally relative to parting line 3 in such a way that during progressive heating along the parting line at one given point on the parting line these inside edges 110, 120 approach the point and, if the point is crossed by inner edges 110, 120, the overlap region 13 crosses over the point.

Based on the diagonal arrangement of impingement regions 11, 12 relative to the parting line, the longitudinal axes of elongated impingement regions 11, 12 are positioned at an angle α relative to one other. This angle can now also be adapted advantageously to other parameters, such as the glass thickness and the feed rate in order to maintain an as high as possible temperature gradient at a changed glass thickness or feed rate.

Without limitation to the illustrated embodiment, it is therefore generally provided that the angle of the longitudinal axes of the elongated impingement regions relative to the parting line is adjusted depending upon the feed rate or the thickness of the thin glass. Thus, the influence of the heat conduction in the direction of the predetermined cut can be controlled at lower speeds. A greater influence of the heat conduction in lateral direction leads to a reduction of the stress gradient. Generally, it is herein advantageous to reduce the angle at higher feed speeds.

With the oblong, for example oval impingement regions 11, 12 and overlap region 13 at their ends, the combined impingement region representing effective zone 4 has a v-shaped form that is open in the cutting direction.

Figure 4:
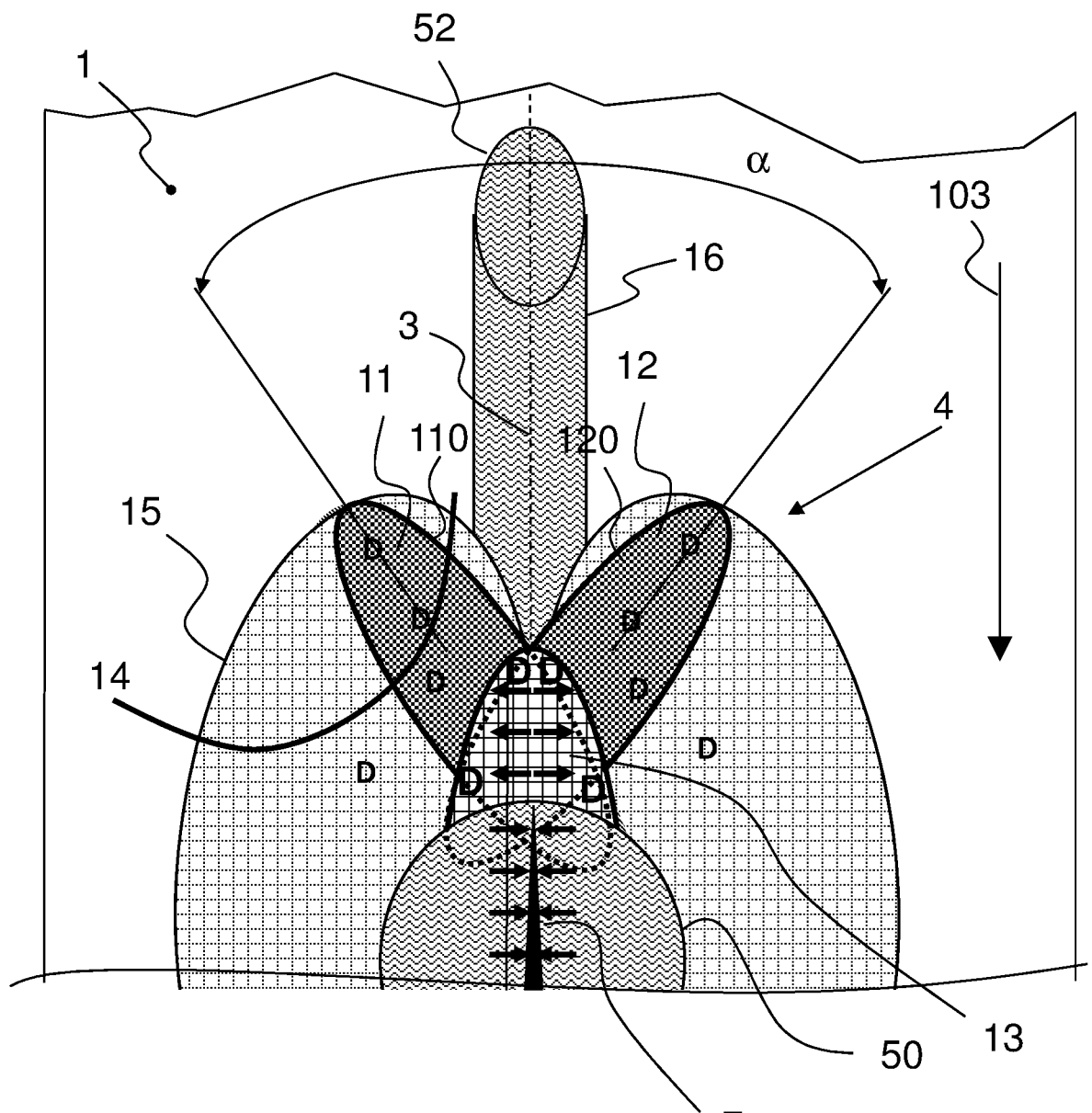
FIG. 4 illustrates a variation of the example illustrated in FIG. 3 with an additional cooling jet.

FIG. 4 illustrates a variation of the embodiment that is illustrated in FIG. 3. In this embodiment, and without limitation to the illustrated embodiment, a second cooling jet is generally used, whose impingement region 52 in feed direction is located before impingement regions 11, 12 of energy sources 9, 10, so that during advancement, a point of the thin glass on the parting line first passes through impingement location 52 of the second cooling jet, then through the overlap region and then through impingement region 51 of the second cooling jet.

Viewed in feed direction after impingement region 52 of the second cooling jet, a cooling zone is produced through which again parting line 3 passes. During movement of thin glass 1 relative to the energy sources, this cooling zone then impacts on overlap region 13 of the two impingement regions 11, 12 of the energy sources, so that an even steeper temperature increase can be achieved.

A further improvement of the edge quality and straightness of the cut may be achieved if the intensity profiles of the energy sources are as defined as possible. In the case that electromagnetic radiation is the energy source, this can be achieved according to the invention with apertures. Accordingly, electromagnetic beams, for example laser beams are used as energy sources 9, 10 in this embodiment of the invention. Their intensity distribution is changed prior to impingement onto thin glass 1 in that an aperture is used to block out local regions of the respective beam with lower intensity vis-à-vis the maximum intensity. Such areas of lower intensity are typically found at the edge of the beam profile. Areas may be blocked out, whose intensity is less than 80%, for example less than 90% of the maximum intensity.

An example in FIG. 5 shows two beam profiles 26, 27, illustrated as intensity progression in one direction vertically relative to the direction of the beam, for example along longitudinal direction of oblong impingement regions 11, 12 that are illustrated in FIGS. 3 and 4. Beam profile 26 that is indicated by dashes is a profile as obtained through suitable lenses or mirrors after formation of the laser beam. The intensity of beam profile 26 herein still decreases continuously over a wide range toward the edge. These edge regions are cut by means of an aperture 25, so that modified beam profile 27 results. With this beam profile, the intensity now increases abruptly at the edge to values near the maximum value. Accordingly, with such a beam profile, a more rapid temperature increase is achieved when overlapping region 13 crosses over the glass.

In the embodiments illustrated in FIGS. 3 and 4, the beam profile of the laser beams and accordingly then also impingement region 11, 12 are elliptical. The invention may also be realized with other beam geometries. FIG. 6 illustrates several applicable examples. Example 6(a) shows a simple circular impingement region 11, 12. The overlap region of two such impingement regions would then have the shape of a lens. Example 6(b) illustrates an elliptical beam profile, or respectively an elliptical impingement region as is the basis also for the examples in FIGS. 3 and 4. Example 6(c) is a triangular shaped impingement region. Impingement regions 11, 12 may for example be directed onto thin glass 1, side by side, overlapping, with the tip in cutting direction. As is the case in the examples in FIGS. 1 and 2, the sides of the triangle facing one another then form inside edges of the impingement region, progressing toward each other. A square impingement region is also conceivable, as illustrated in example 6(d). Here, also the diagonal of the square may point into the feed direction.

With oblong impingement regions, different positions of center lines 111, 121 of the impingement regions are moreover possible. Examples for this are shown in FIG. 7. Feed direction 103 is also indicated in FIG. 7. In examples 7(a) and 7(b), center lines 111, 121 intersect. Accordingly, the point of intersection of the center lines is located in the overlap region. With sufficient overlap of elliptical impingement regions 11, 12 a configuration according to example 7(b) may for example exist in the examples illustrated in FIGS. 3 and 4. In the remaining examples 7(c), 7(d), 7(e) and 7(f) the center lines do not intersect. Overlapping regions nevertheless occur due to overlapping of the edge zones of respective impingement regions 11, 12. Each of the illustrated designs can offer special advantages in regard to edge quality depending on the type of glass, glass thickness and feed rate.

With the inventive method with which by way of two energy sources two overlapping impingement regions are heated at the intended separation line, strong edges may be produced in thin glasses. This is especially true for thin glasses having a maximum thickness of 250 μm for which the method offers special advantages, since despite of rapid heating of such thin glasses, a high stress gradient can nevertheless be built up.

Regarding the glass strength it is to be noted that this is essentially determined by the strength at the edges. Cracks originating at the edges of a glass that is failing under bending stress may occur considerably more frequently than fractures emerging from the surface of the glass.

Figure 8:
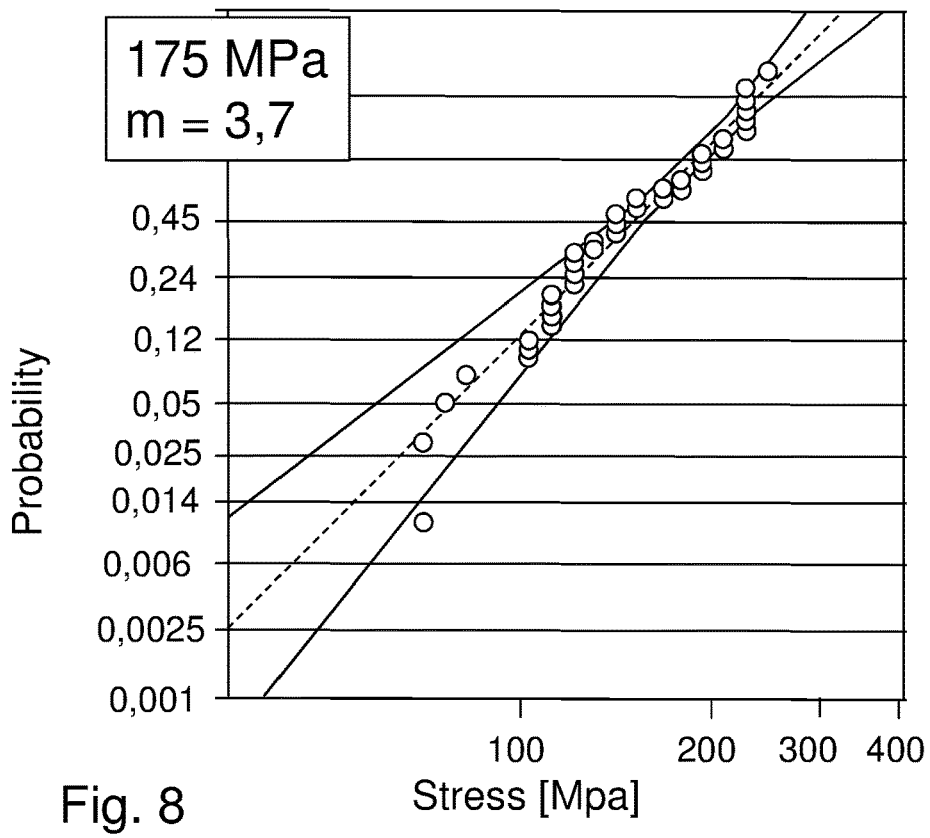
FIG. 8 illustrates a comparison example of a diagram illustrating the probability of breaking of thin glass samples, depending upon an applied breaking stress, wherein the thin glass samples were cut in a conventional manner.
Figure 9:
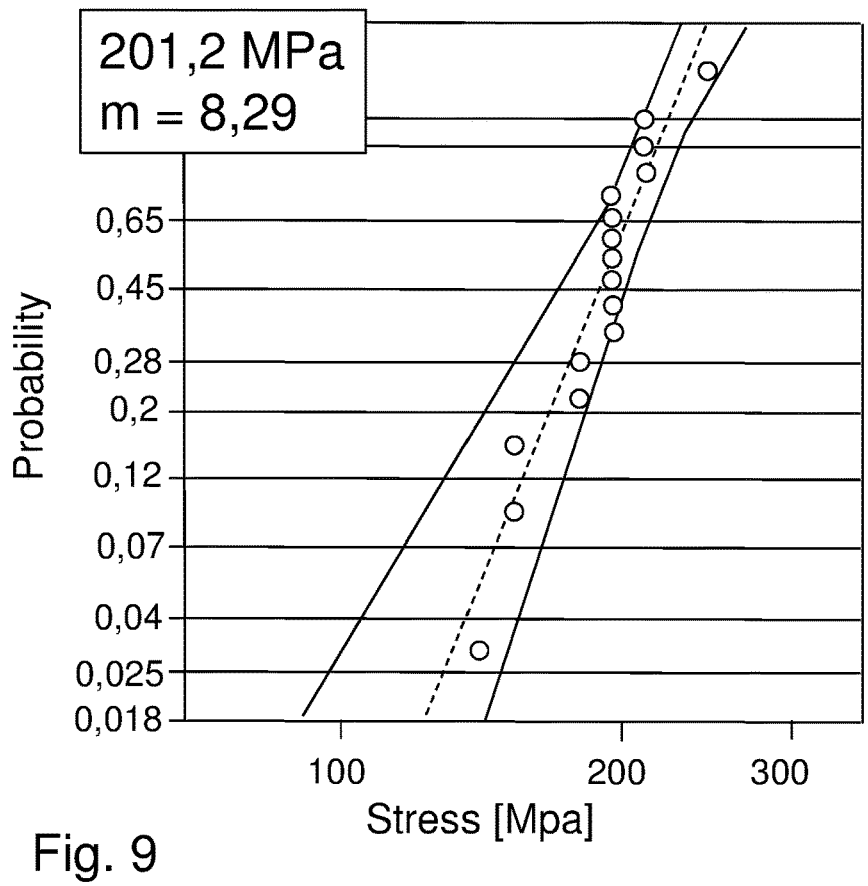
FIG. 9 is a diagram illustrating the probability of breaking of thin glass samples, depending upon an applied breaking stress, wherein the thin glass samples were cut according to the invention by means of stress crack separation.

This is clearly substantiated on the basis of the examples in FIG. 8 and FIG. 9. Both drawings are double-logarithmic diagrams of the probability of fracture as a function of the flexural stress of the thin glass samples. If the probability of fractures is consistent with a Weibull distribution, then the measurement values of the flexural stress at the fracture of the respective sample in this double-logarithmic illustration are ideally linearly correlated. In both diagrams, this is well met. In the diagram shown in FIG. 8, the samples were cut with a conventional laser-induced stress separation process with a laser spot. For the measured values shown in FIG. 9, the inventive method was used with overlapping impingement regions of the laser spots, arranged adjacent to one another, left and right of the parting line. Concerning the measured values in FIG. 8, the mean breaking stress is therefore around 175 MPa. As a form parameter of the Weibull distribution that reflects the gradient of the measured values in the diagram, a value of m=3.7 results.

With the thin glass samples that were cut according to the invention and were otherwise identical, a mean value of the breaking stress of 201.2 MPa and a form parameter m=8.29 results.

It is therefore demonstrated that, with thin glasses having thicknesses of 250 μm or less a considerable increase in strength can be achieved. This is expressed especially in the form parameter of the underlying Weibull distribution. Generally, and without limitation to the illustrated embodiments, the invention also relates to a thin glass that can be produced with the invention. The glass may have a thickness of 250 μm maximum, that has at least one edge that is cut by way of stress crack separation, in particular laser stress crack separation, wherein the thin glass pane has a Weibull distribution with a Weibull module of at least m=6, for example at least m=7 for fractures originating from the edge under flexural stress. As also in the example illustrated in FIG. 9, the Weibull module may even be m=8 or more. Glasses whose edges were processed according to the invention have an accordingly high life span under flexural stress. The minimum thickness of the thin glass is preferably 5 μm.

For mechanical stress σ, that is caused during separation due to the temperature difference that is produced by the inventive method, the following applies:

$$\sigma = \frac{\alpha E}{1-\mu}\Delta T$$

α herein identifies the thermal coefficient of expansion, E the elasticity module and μ the Poisson-ratio of the glass.

Specific characteristic values are listed in the following table for some glasses that are suitable for the invention. Parameter Tg signifies the transformation temperature.

|  | Tg | ☐ 20-300 | E | ☐ |
|---|---|---|---|---|
| AF32 eco (8266) | 715° C. | 3.2 ppm/K | 74.8 kN/mm² | 0.238 |
| AF37 (8264) | 711° C. | 3.77 ppm/K | 78. kN/mm² | 0.240 |
| AF45 | 662° C. | 4.50 ppm/K | 66 kN/mm² | 0.235 |
| D263 T eco | 557° C. | 7.2 ppm/K | 72.9 kN/mm² | 0.208 |
| BF33 (MEMpax) | 525° C. | 3.25 ppm/K | 64 kN/mm² | 0.2 |
| B270 | 533° C. | 9.4 ppm/K | 71.5 kN/mm² | 0.219 |
| As87 (8787) | 615° C. | 8.8 ppm/K | 74 kN/mm² | 0.215 |

A suitable group of glasses for the invention are non-alkaline borosilicate glasses. For example, following composition in weight percent may be provided:

| Component | Weight % |
|---|---|
| SiO₂ | 58-65 |
| Al₂O₃ | 14-25 |
| B₂O₃ | 6-10.5 |
| MgO | 0-3 |
| CaO | 0-9 |
| BaO | 3-8 |
| ZnO | 0-2 |

These glasses are also described in US 2002/0032117 A1, the content of which in regard to the glass compositions and glass properties in their entirety are considered part of the current invention. One glass in this category is the AF32 glass that is already listed in the table.

An additional category of glass types are borosilicate glasses, comprising the following components:

| Components | Weight % |
|---|---|
| SiO₂ | 30-85 |
| B₂O₃ | 3-20 |
| Al₂O₃ | 0-15 |
| Na₂O | 3-15 |
| K₂O | 3-15 |
| ZnO | 0-12 |
| TiO₂ | 0.5-10 |
| CaO | 0-0.1 |

One glass in this class of glasses is Schott glass D263 that is already listed in the table. These glasses with more precise compositions are also described in further detail in US 2013/207058 A1, the content of which in regard to the glass compositions and their properties in their entirety are considered part of the current invention.

Figure 10:
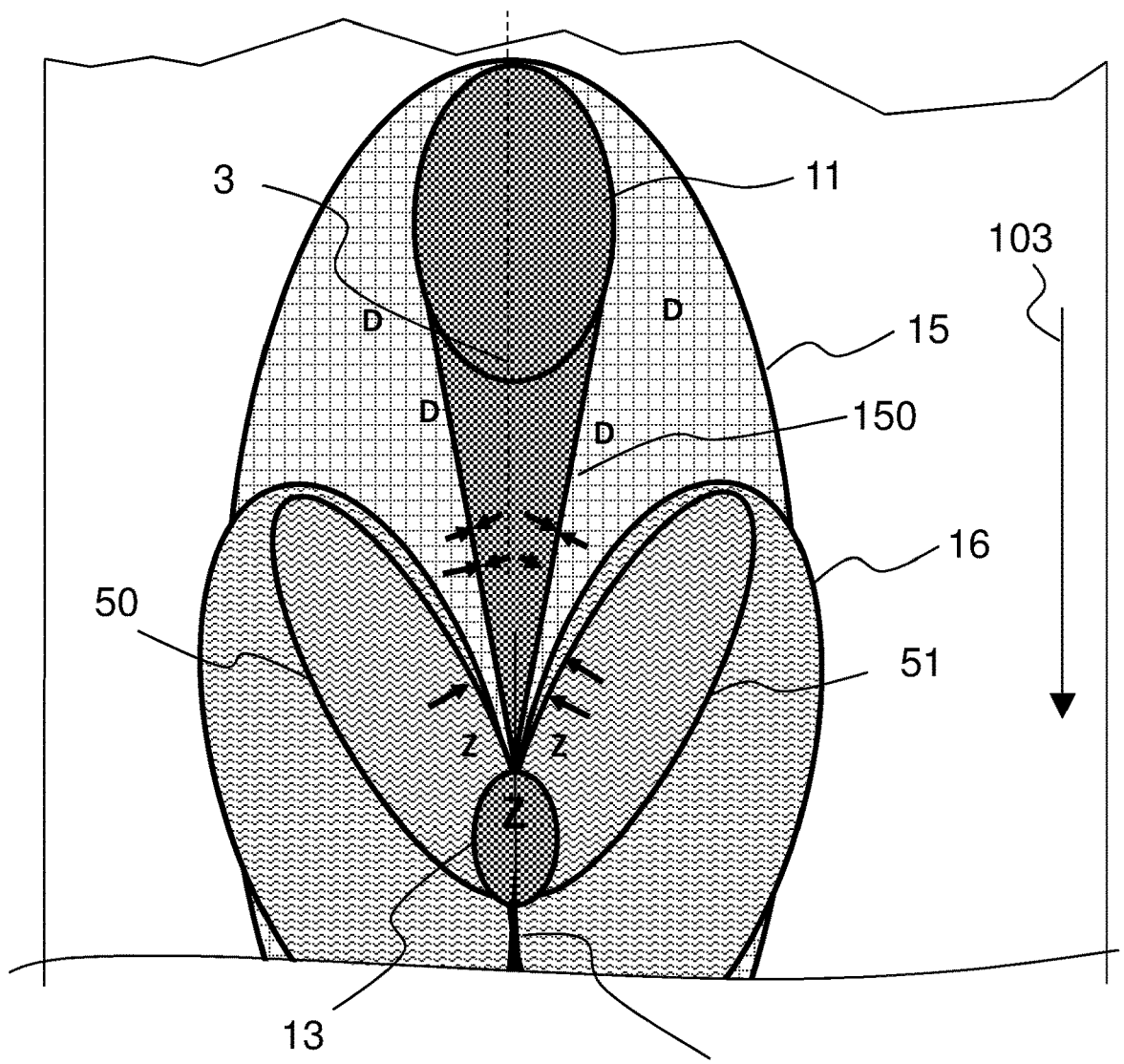
FIG. 10 illustrates another embodiment of the invention, wherein a high stress gradient is produced with two overlapping cooling jets after a point-like heat source.

In the hitherto illustrated design variations, overlapping impingement regions of two energy sources are used with which the glass is rapidly heated. Vice versa, according to an additional embodiment of the invention it is also conceivable to first heat the glass and then produce the necessary stress for separating the glass by way of two cooling jets with laterally overlapping impingement regions. FIG. 10 illustrates an example hereto.

Accordingly, a method for separating thin glass 1 having a thickness of less than 1.2 mm is provided, wherein thin glass 1 is progressively heated by means of an energy source 9 in an impingement region 11, along a path which defines a parting line 3, so that also impingement region 11 of energy source 9 is located on parting line 3 and is subsequently cooled, so that a mechanical stress is produced in the glass due to the created temperature difference and a crack 7 propagates following the mechanical stress along the path. The cooling of the glass may occur by way of two cooling jets that respectively cool the previously heated thin glass 1 in an impingement region 50, 51, wherein impingement regions 50, 51 are offset in vertical direction laterally relative to the parting line and intersect in an overlap region 13, so that parting line 3 passes through this overlap region 13.

Impingement region 11 of energy source 9 that is located upstream from impingement regions 50, 51 of the cooling jets, causes a thermal conduction zone 15 in which the created heat is distributed. Accordingly, a cold conducting zone 16 is also caused by the cooling jets, originating from their impingement regions 50, 51.

The glass heated in central area 150 of the thermal conduction zone—due to the movement along the feed direction—then impacts onto overlap region 13 where the two impingement regions 50, 51 of the cooling jets overlap, thereby creating rapid cool-down. Like in the embodiments in FIG. 3 and FIG. 4, propagation of crack 7 along parting line 3 is caused as a result of the thus produced stress gradient.

As explained above, extended durability can be achieved for thin glass elements that are cut according to the invention, even if they are subjected to continuous flexural stress or generally to superficial tensile stress. To ensure a low break ratio within a long life-span, a thin glass element 100 is provided that, in a further development of the invention is subjected to tensile stress, in particular due to a flexural stress, wherein the tensile stress is lower than the following term:

$$1.15 \times \mathrm{Min}\!\left(\overline{\sigma}_a - \Delta_a\, 0.4 \times \!\left(1 - \ln\!\left(\frac{A_{ref}}{A_{App}}\Phi\right)\right)\!,\right. \qquad (1)$$
$$\left. \overline{\sigma}_e - \Delta_e\, 0.4 \times \!\left(1 - \ln\!\left(\frac{L_{ref}}{L_{App}}\Phi\right)\right)\!\right)\!,$$

wherein $\overline{\sigma}_a$ and $\overline{\sigma}_e$ are mean values of the tensile stress during breakage of samples of the glass element, wherein $L_{ref}$ describes the edge length and $A_{ref}$ describes the surface of the samples, wherein $\overline{\sigma}_a$ is the mean value of the tensile stress during a fracture in the surface of the samples and $\overline{\sigma}_e$ is the mean value of the tensile stress during a crack originating from the edge of the sample, produced with the method according to the invention, and wherein $\Delta_e$ and $\Delta_a$ describe the standard deviation of the mean values $\overline{\sigma}_e$ or respectively $\overline{\sigma}_a$, and wherein $A_{app}$ is the surface of the thin glass element and $La_{pp}$ is the combined edge length of edges of the glass element opposite one another and $\Phi$ is the predetermined maximum breakage ratio within a time period of at least half a year.

The maximum predetermined breakage ratio $\Phi$ is, for example, 0.1 or less (10% at most), for example less than 0.05 (less than 5%).

With the further development of the invention a thin glass element 100 is thus produced, that is subjected to a tensile stress $\sigma_{app}$ that is less than the term cited above (1). The tensile stress can for example be caused through winding or through fastening to a support with forced bending.

To achieve a low probability of breakage of the thin glass element within an extended time period, for example up to ten years, the glass element may be subjected to a tensile stress that is less than:

$$0.93 \cdot \mathrm{Min}\!\left(\overline{\sigma}_a - \Delta_a\, 0.4 \cdot \!\left(1 - \ln\!\left(\frac{A_{ref}}{A_{app}}\Phi\right)\right)\!,\, \overline{\sigma}_e - \Delta_e\, 0.4 \cdot \!\left(1 - \ln\!\left(\frac{L_{ref}}{L_{app}}\Phi\right)\right)\!\right) \qquad (2)$$

Already this comparatively small reduction in the maximum tensile strength by a factor of 1.15/0.93=1.236 leads to a considerable increase in the life span of the glass articles subjected to the tensile stress.

With the invention, it is possible to wind thin glass ribbons into rolls, that—in regard to their inside radius—are dimensioned in such a way that they survive a predetermined time period, for example an average or maximum storage period with a high probability of zero damage. This applies generally also to other forms of further processing of the thin glass wherein the produced glass is subjected to tensile stress. As in the embodiment of the roll, or respectively with a subsequently processed glass article, the most frequently occurring tensile stresses are caused through bending of the thin glass. Minimum bending radius R hereby has the following correlation with tensile stress $\sigma_{app}$:

$$\sigma_{app} = \frac{E}{1 - v^2}\frac{t}{2R} \qquad (3)$$

In this correlation, E describes the elasticity module, t the thickness of the thin glass and v the Poisson's ratio of the glass. Glass thicknesses are stated in the above description.

For the bending radius that fulfills the condition of a maximum tensile stress $\sigma_{app}$ that was calculated according to term (1), the following relationship results between bending radius and tensile stress through combination with equation (3):

$$R \geq \frac{\frac{E}{1-v^2}\cdot t}{2.3 \cdot \mathrm{Min}\!\left(\overline{\sigma}_a - \Delta_a\, 0.4 \cdot \!\left(1 - \ln\!\left(\frac{A_{ref}}{A_{app}}\Phi\right)\right)\!,\, \overline{\sigma}_e - \Delta_e\, 0.4 \cdot \!\left(1 - \ln\!\left(\frac{L_{ref}}{L_{app}}\Phi\right)\right)\!\right)} \qquad (4)$$

From the combination of equation (3) with term (2) for the bending radius with which a low probability of breakage over a longer time period is achieved, the following equation results:

$$R \geq \frac{\frac{E}{1-v^2} \cdot t}{1.86 \cdot \text{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4 \cdot \left(1 - \ln\left(\frac{L_{ref}}{L_{app}}\Phi\right)\right)\right)} \quad (5)$$

Figure 11:
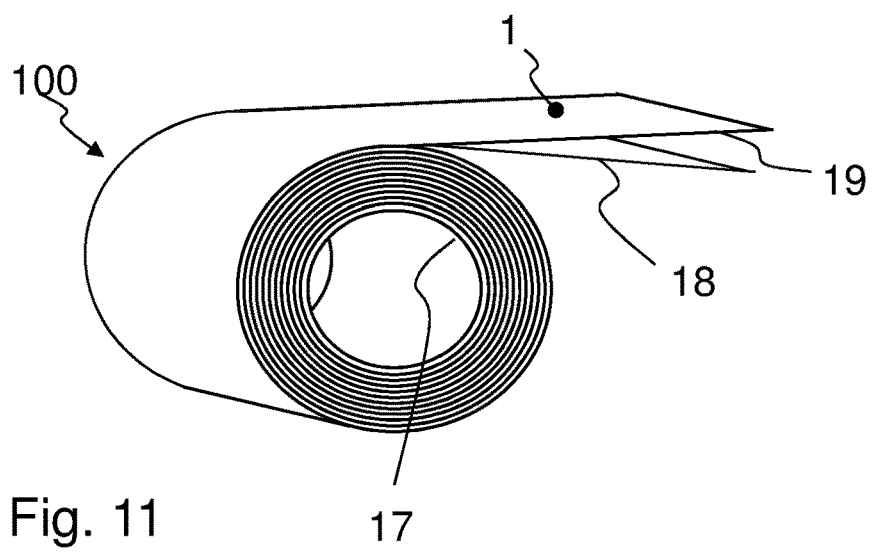
FIG. 11 illustrates a thin glass element in the embodiment of a glass roll that was cut according to the invention.

For a thin glass element 100 in the embodiment of a thin glass ribbon that is wound onto a roll, as illustrated in FIG. 11, the minimum bending radius R of the thin glass ribbon from which according to correlation (3) the maximum tensile strength $\sigma_{app}$ results, is on inside 17 of the roll. To keep the roll manageable and small, bending radii where the maximum tensile stress occurs on inside 17 may be used, but amounts to at least 21 MPa. The edges of the thin glass that are located on the end faces of the roll were produced by way of separating braids 101, 102, as already described with reference to FIG. 1. The method with which the parameters of the above equations are determined is also described in detail in PCT/EP2014/070826, whose content is incorporated herein by reference To protect the individual layers of the roll from each other, a web material 18 can be wound simultaneously between the layers.

For the embodiments of the invention described above, two equations are cited for respectively firmly defined minimum life spans of more than 6 months, or respectively of more than one year. If necessary, another predetermined life span can be specified. Even though minimum radii result from terms (1), (2) it can also be desirable to specify a range of admissible radii with which a certain life span is achieved. If necessary it is moreover difficult to discriminate as to whether during the breakage tests, a break originated from an edge or from within the surface. According to yet another embodiment of the invention it is therefore provided that breakage tests are conducted, whereby the breaking stress or respectively the corresponding bending radii are recorded during the break and that on the basis of this data, statistical parameters are determined and that, on the basis of these parameters a range for a bending radius is determined that guarantees a certain, especially a long lifespan of the glass article that is subjected to mechanical stress.

The invention relates to a thin glass element 100 with edges 19 produced according to the invention by way of laser stress crack separation, for example in the embodiment of a thin glass roll with wound thin glass 1 in form of a thin glass ribbon having a length of for example at least 10 meters, wherein the inside radius of the wound thin glass or more generally, the bending radius of the bent thin glass is in the range of $$R_{min} = \langle R \rangle \left\{ \left[0.7 + \exp\left(\frac{s}{\langle R \rangle \cdot 0.053} - 2.3\right)\right] \cdot (2 - e^{-t}) \right\} \text{ to} \quad (8)$$

$$R_{max} = \langle R \rangle \left\{ \left[3.4 + \exp\left(\frac{s}{\langle R \rangle \cdot 0.05} - 2.1\right)\right] \cdot (2 - e^{-t}) \right\}, \text{ wherein} \quad (9)$$

$$s = \sqrt{\frac{1}{N-1} \sum R_i^2 - \langle R \rangle^2} \text{ and} \quad (10)$$

wherein $\langle R \rangle$ is the mean value and is the variance of the bending radii $R_i$ at the breakage of a plurality of samples of same glass material with same thickness and same glass edges as the glass material of the thin glass element, wherein $R_i$ represents the bending radii at which the samples respectively break, N is the number of the plurality of samples of same glass material with same thickness and same glass edges as the glass material of the thin glass element, and t represents a predetermined minimum duration in days over which the thin glass element survives without breaking. Such time delayed breaks are herein caused, for example by stress crack corrosion.

An appropriate method to produce a thin glass element 100 in the embodiment of a roll consisting of a wound thin glass 1 having a length of, for example, at least 10 meters accordingly is based on that, the mean value $\langle R \rangle$ of bending radii $R_i$ as well as the variance s are determined with a breaking test of a plurality N of samples (10) that are subjected to progressively greater bending stress, and that a thin glass ribbon consisting of the same glass material having the same thickness and same glass edges as the glass material of samples (10) is provided. At least its longitudinal edges are produced according to the invention by laser stress crack separation and that the thin glass ribbon is wound onto a roll. The inside radius of the roll that is the innermost layer of the thin glass ribbon is selected so that it is within the range of $R_{min}$ according to equation (8) to $R_{max}$ according to equation (9). t is a predetermined minimum duration in days over which the thin glass roll is to survive without breaking. In general, certain probability of breaking is however typically present with glass ribbons, even at very high bending radii. However, the parameters of equations (8) and (9) are coordinated so that the breaking ratio is within a predetermined minimum duration, generally less than 0.1, for example less than 0.05.

In this embodiment of the invention the inventive production of the edges and their improved strength also influences parameters s and $\langle R \rangle$. Due to the increased edge strength, the mean value $\langle R \rangle$ is increased overall compared to samples with edges that are not cut according to the invention. Depending on the nature of the present edge defects compared with samples that are not produced according to the invention, variation s can increase or decrease.

To obtain a sufficiently trustworthy statistic for a reliable determination of the bending radius within the range defined by equations (8) and (9), at least twenty, for example at least 50 samples of thin glass are stressed with a bending stress and thus with tensile stress until they break, in order to determine mean value $\langle R \rangle$ of the bending radii $R_i$ and their variance. The implementation of the method, as well as the determination of the parameters of equations (8) to (10) are described in detail in DE 10 2014 113 149.5, the content of which in this regard is incorporated herein by reference.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| Component identification listing | |
| --- | --- |
| Thin glass | 1 |
| Device for | 2 |
| Stress crack separation | |
| Parting line | 3 |
| Effective zone | 4 |
| Cooling jet | 5, 6 |
| Crack | 7 |
| Laser | 8 |
| Energy source | 9, 10 |
| Impingement region | 11, 12 |
| Overlap region | 13 |
| Cut-out | 14 |
| Thermal conduction zone | 15 |
| Cold conduction zone | 16 |
| Inside thin glass roll | 17 |
| Web material | 18 |
| Edge of 100 | 19 |
| Feed device | 20 |
| Levitation support | 21 |
| Aperture | 25 |
| Beam profile before aperture | 26 |
| Beam profile after aperture | 27 |
| Cooling jet generator | 40, 41 |
| Partial regions of 4 | 42, 44 |
| Impingement region of cooling jet | 50, 51, 52 |
| Belt | 54, 55 |
| Vacuum suction | 53 |
| Beam splitter | 80 |
| Partial beams | 81, 82 |
| Scribing device | 89 |
| Braids | 101, 102 |
| Feed direction | 103 |
| Inside edges of 11, 12 | 110, 120 |
| Center lines of 11, 12 | 111, 121 |
| Center region 15 | 150 |
| Thin glass element | 100 |

What is claimed is:

1. A method for separating a thin glass having a thickness of less than 1.2 mm, the method comprising the steps of:

heating the thin glass progressively along a path which forms a parting line, wherein the thin glass is heated by an energy of at least one energy source within an effective zone of said at least one energy source on the thin glass, wherein a pair of partial regions of the effective zone are spaced laterally relative to the parting line and frame a cut-out in the effective zone through which the parting line progresses, in such a way that in a section of this space, at least one area of thin glass next to the parting line is heated more strongly than at least one area on the parting line; and moving the thin glass in a direction of movement such that the effective zone is moved over the thin glass along the parting line so that by way of a temperature gradient of a portion of glass that is heated by way of said at least one energy source, a mechanical stress is generated in the portion of glass that is heated in relation to a surrounding glass, due to the mechanical stress a crack propagates, following the mechanical stress along the parting line, wherein the effective zone is shaped so that during a movement of the thin glass along the parting line said pair of partial regions merge in the direction of movement of the thin glass and meet on the parting line, and wherein a pair of impingement regions that are formed by the partial regions comprise a respective inside edge and a longitudinal axis, said inside edges of the pair of impingement regions face each other and progress diagonally to the parting line, in such a way that, for a given point on the parting line during progressive heating along the parting line, said inside edges progress toward the given point on the parting line, and said longitudinal axes of the pair of impingement regions are diagonal relative to the parting line.

2. The method of claim 1, wherein heating of the thin glass occurs by way of a pair of energy sources which respectively impinge in a first and a second impingement region on the thin glass, the effective zone is formed by at least the first and the second impingement region, and wherein the energy sources are directed onto the thin glass in such a way that the first and second impingement regions are offset laterally to one another in a vertical direction relative to the parting line, wherein the two impingement regions intersect in an overlap region so that the parting line progresses through this overlap region and as a result of the temperature difference between the glass that is heated by way of the energy sources and the surrounding glass, especially the glass entering the overlap region along the parting line, the mechanical stress is produced in the thin glass as a result of which the crack following the mechanical stress propagates along the parting line.

3. The method of claim 2, wherein the first and the second energy sources impinge onto the glass in a synchronized manner.

4. The method of claim 2, including a further step wherein subsequent to heating, the thin glass is then cooled with a first cooling jet, whereby the first cooling jet is directed onto the glass in such a manner that the first cooling jet has an impingement region that is located on the parting line.

5. The method of claim 1, wherein a pair of braids are trimmed off the thin glass.

6. The method of claim 2, wherein said two impingement regions are elliptical.

7. The method of claim 2, wherein electromagnetic beams are used as energy sources and an intensity distribution of said electromagnetic beams is changed prior to impingement onto the thin glass in that an aperture is used to block out local areas of each respective beam with a lower intensity vis-à-vis a maximum intensity.

8. The method of claim 2, wherein the thin glass is heated by a pair of laser beams as the energy sources.

9. The method of claim 1, wherein a section of the effective zone is masked to form the cut-out in the effective zone on the thin glass.

10. The method of claim 4, wherein the thin glass is supported on a gas cushion that is generated by a levitation support, or is guided over the gas cushion, wherein the impingement regions of the energy sources and the impingement region of the first cooling jet are arranged in a section of thin glass that is supported by the gas cushion.

11. The method of claim 4, wherein a second cooling jet is used, said second cooling jet has a point of impingement, which when viewed in a feed direction is located before said impingement regions of said energy sources, so that a point of thin glass on the parting line during forward feed first passes through said point of impingement of the second cooling jet, then through said first impingement region, then through said second impingement region, and then through said impingement region of the first cooling jet.

12. The method of claim 4, wherein said first cooling jet is in the form of at least one of an aerosol jet, a moistened gas jet having a relative humidity in the range of 70% to 100%, a liquid jet, and a droplet jet.

13. A method, comprising the steps of:

providing a thin glass element consisting of a thin glass, the thin glass element has a maximum thickness of 250 µm;

heating the thin glass progressively along a path which forms a parting line, wherein the thin glass is heated by an energy of at least one energy source within an effective zone of said at least one energy source on the thin glass, wherein a pair of partial regions of the effective zone are spaced laterally relative to the parting line and frame a cut-out in the effective zone through which the parting line progresses, in such a way that in a section of this space, at least one area of thin glass next to the parting line is heated more strongly than at least one area on the parting line;

moving the thin glass in a direction of movement such that the effective zone is moved over the thin glass along the parting line so that by way of a temperature gradient of a portion of glass that is heated by way of said at least one energy source, a mechanical stress is generated in the portion of glass that is heated in relation to a surrounding glass, due to the mechanical stress a crack propagates, following the mechanical stress along the parting line, wherein the effective zone is shaped so that during a movement of the thin glass along the parting line said pair of partial regions merge in the direction of movement of the thin glass and meet on the parting line, and wherein a pair of impingement regions that are formed by the partial regions comprise a respective inside edge and a longitudinal axis, said inside edges of the pair of impingement regions face each other and progress diagonally to the parting line, in such a way that, for a given point on the parting line during progressive heating along the parting line, said inside edges progress toward the given point on the parting line, and said longitudinal axes of the pair of impingement regions are diagonal relative to the parting line; and cutting at least one edge by way of a laser stress crack separation.

14. The method of claim 13, further including:
providing a plurality of samples of the glass element;
breaking the plurality of samples of the glass element;
deriving a mean value $\overline{\sigma}_a$ of a tensile stress during a facture in a surface of the plurality of samples;
deriving a mean value $\overline{\sigma}_e$ of a tensile stress during a crack originating from an edge of the plurality of samples; and
subjecting the thin glass element to a tensile stress $\sigma_{app}$ that is lower than:

$$1.15 \times \mathrm{Min}\left(\overline{\sigma}_a - \Delta_a\, 0.4 \times \left(1 - \ln\left(\frac{A_{ref}}{A_{App}}\Phi\right)\right),\ \overline{\sigma}_e - \Delta_e\, 0.4 \times \left(1 - \ln\left(\frac{L_{ref}}{L_{App}}\Phi\right)\right)\right),$$

wherein $L_{ref}$ describes an edge length of the plurality of samples and $A_{ref}$ describes an area of the plurality of samples, wherein $\Delta_e$ and $\Delta_a$ describe a standard deviation of the mean values $\overline{\sigma}_e$ or respectively $\overline{\sigma}_a$, and wherein $A_{app}$ is an area of the thin glass element and $L_{app}$ is a combined edge length of edges of the glass element opposite one another and $\Phi$ is a predetermined maximum breakage ratio of 0.1 maximum within a time period of at least half a year.

15. The method of claim 13, further including:
providing a plurality of samples of the glass element;
breaking the plurality of samples of the glass element;
deriving a mean value $\overline{\sigma}_a$ of a tensile stress during a facture in a surface of the plurality of samples;
deriving a mean value $\overline{\sigma}_e$ of a tensile stress during a crack originating from an edge of the plurality of samples; and
subjecting the thin glass element to a tensile stress $\sigma_{app}$ that is lower than:

$$0.93 \times \mathrm{Min}\left(\overline{\sigma}_a - \Delta_a\, 0.4 \times \left(1 - \ln\left(\frac{A_{ref}}{A_{app}}\Phi\right)\right),\ \overline{\sigma}_e - \Delta_e\, 0.4 \times \left(1 - \ln\left(\frac{L_{ref}}{L_{app}}\Phi\right)\right)\right),$$

wherein $L_f$ describes an edge length of the plurality of samples and $A_{re}f$ describes an area of the plurality of samples, wherein $\Delta_e$ and $\Delta_a$ describe a standard deviation of the mean values $\overline{\sigma}_e$ or respectively $\overline{\sigma}_a$, and wherein $A_{app}$ is an area of the thin glass element and $L_{app}$ is a combined edge length of edges of the glass element opposite one another and $\Phi$ is a predetermined maximum breakage ratio of 0.1 maximum within a time period of at least half a year.

16. The method of claim 13, further including:
providing a plurality of samples of a same glass material with a same thickness and same glass edges as a glass material of the thin glass element;
breaking the plurality of samples;
deriving a bending radii $R_i$ at which the plurality of samples respectively break;
deriving a mean value (R) which is a variance of the bending radii $R_i$ at the breakage of the plurality of samples; and
winding the thin glass element such that said thin glass element is in an embodiment of a roll of wound thin glass having a length of at least 10 meters and a thickness of 200 micrometers at most, wherein an inside radius of the wound thin glass is in a range of:

$$R_{min} = \langle R \rangle\left\{\left[0.7 + \exp\left(\frac{s}{\langle R \rangle \cdot 0.053} - 2.3\right)\right] \cdot (2 - e^{-t})\right\} \text{ to}$$

$$R_{max} = \langle R \rangle\left\{\left[3.4 + \exp\left(\frac{s}{\langle R \rangle \cdot 0.05} - 2.1\right)\right] \cdot (2 - e^{-t})\right\}, \text{ wherein}$$

$$s = \sqrt{\frac{1}{N-1}\sum R_i^2 - \langle R \rangle^2} \text{ and}$$

wherein N is a number of the plurality of samples and t represents a predetermined minimum duration in days over which the thin glass element survives without breaking.

* * * * *

UNITED STATES PATENT AND TRADEMARK OFFICE
CERTIFICATE OF CORRECTION

PATENT NO. : 10,584,054 B2
APPLICATION NO. : 15/661719
DATED : March 10, 2020
INVENTOR(S) : Vogt et al.

Page 1 of 1

It is certified that error appears in the above-identified patent and that said Letters Patent is hereby corrected as shown below:

In the Claims

Column 22
At Line 18, in Claim 15, please delete "$L_f$", and substitute therefore --$L_{ref}$--; and
At Line 19, in Claim 15, please delete "$A_{ref}$", and substitute therefore --$A_{ref}$--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*